Aug. 15, 1967     R. C. JANAY     3,335,626
METHOD AND APPARATUS FOR PERFORATING A TUBULAR OBJECT
Filed April 26, 1965     4 Sheets-Sheet 1
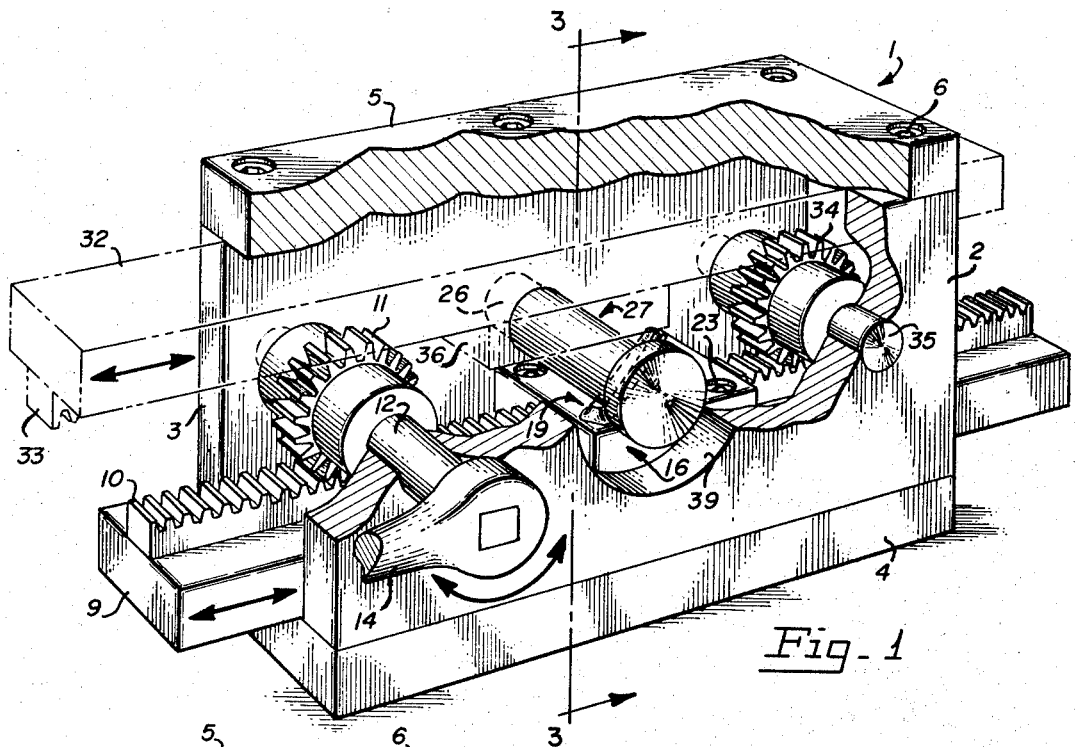
Fig. 1
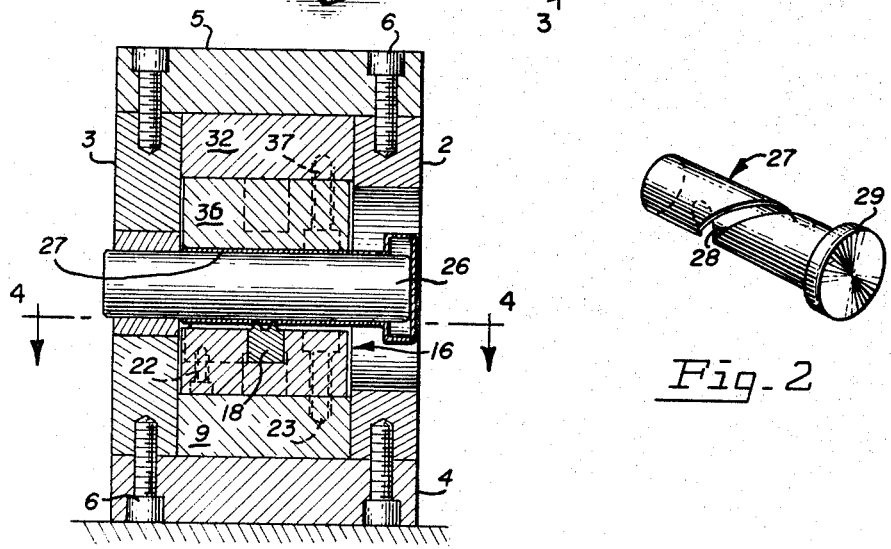
Fig. 3
Fig. 2
INVENTOR
RENÉ C. JANAY
BY
Leon F. Herbert
ATTORNEY INVENTOR
RENÉ C. JANAY
BY
Leon F. Herbert
ATTORNEY Aug. 15, 1967   R. C. JANAY   3,335,626
METHOD AND APPARATUS FOR PERFORATING A TUBULAR OBJECT
Filed April 26, 1965   4 Sheets-Sheet 3

INVENTOR
RENÉ C. JANAY
BY
Leon F. Herbert
ATTORNEY

Aug. 15, 1967  R. C. JANAY  3,335,626
METHOD AND APPARATUS FOR PERFORATING A TUBULAR OBJECT
Filed April 26, 1965  4 Sheets-Sheet 1

INVENTOR
RENÉ C. JANAY
BY
Leon F. Herbert
ATTORNEY

United States Patent Office 3,335,626
Patented Aug. 15, 1967

3,335,626
METHOD AND APPARATUS FOR PERFORATING A TUBULAR OBJECT
Rene C. Janay, East Palo Alto, Calif., assignor to Paul C. Pickert, trustee, Palo Alto, Calif.
Filed Apr. 26, 1965, Ser. No. 450,877
11 Claims. (Cl. 83—54)

This invention relates to a method and apparatus for perforating a tubular object, and more particularly to a method and apparatus for making helical slots in tubular parts of dispensing and retracting devices such as lipstick holders.

In the field of dispensing devices for cosmetic materials such as lipstick, it is customary to employ a tube-like member having a helical slot. The purpose of the slot is to form a camming surface which cooperates in known manner with a cam-follower to dispense or retract the lipstick as the cam-follower is rotated relative to the camming slot or vice versa.

The conventional method for making the tube-like member with the helical slot therein has been to punch a slot in a flat sheet and thereafter roll the sheet into a cylindrical shape. Obviously, the plurality of steps involved contributes proportionally to the cost of the slotted tube-like member. In addition, the rolled up tube-like member is not a continuous cylinder but has a separation throughout its length defined by the two adjacent edges of the formerly flat strip. The above described prior art method of making helically slotted tube-like members has resulted in conventional lipstick holders having at least one more part than would be required if the helical slot could be made in a pre-formed continuous wall tube. In view of the known need for making a helical slot in a pre-formed tube, several proposals have been made for cutting a helical slot in a pre-formed tube. However, no prior proposal for cutting helical slots in pre-formed tubes has been found to be a practical solution to preparing helically slotted tubes in commercial quantities.

Accordingly, it is an object of the present invention to provide apparatus for making helical slots in pre-formed tubular members in a practical manner which will supply the helically slotted tubes in large quantities at low cost.

Another object of the invention is the provision of a method of producing helically slotted tubular members which is more efficient than prior methods including that of stamping a slot in a flat sheet prior to rolling the sheet into a tube-like shape.

A further object of the invention is the provision of an improved method and apparatus for making perforations having any desired shape in tubular members.

These and other objects, features and advantages of the invention will become further apparent from the following detailed description thereof wherein reference is made to the accompanying drawings, in which:

FIGURE 1 is a perspective view, with parts broken away, of one embodiment of the invention in which the perforating action is accomplished by linear movement of the perforating member. In FIGURE 1 some of the parts are shown in phantom outline to clarify the disclosure;

FIGURE 2 is a perspective view of a tubular member of a lipstick holder assembly which has been perforated by the apparatus shown in FIGURE 1;

FIGURE 3 is a section taken on the line 3—3 of FIGURE 1;

In FIGURE 6 the tubular member has been removed from the mandrel;

Figure 4:
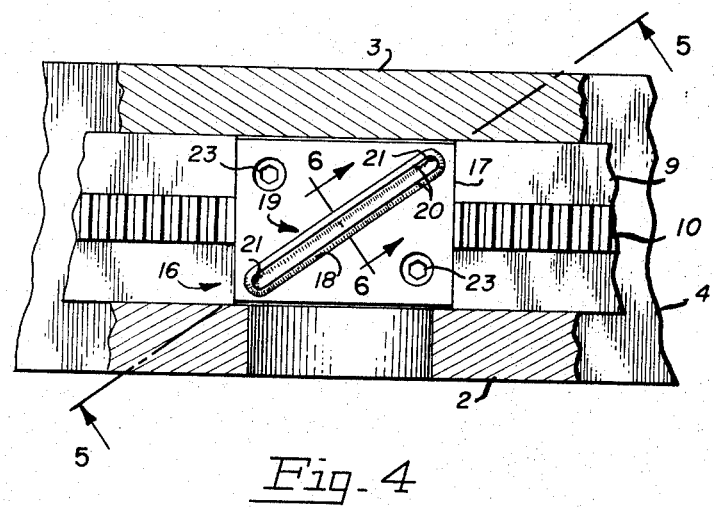
FIGURE 4 is a section taken on the line 4—4 of FIGURE 3 and showing a top plan view of the perforating member.

Referring in more detail to the drawings, FIGURE 1 shows one embodiment of apparatus according to the invention for perforating tubular objects. The apparatus comprises a supporting structure 1 having a front side wall 2, a back side wall 3 and bottom and top walls 4 and 5. In one arrangement, the walls are secured together by screws 6 which pass through the top and bottom walls into the side walls.

The front, back and bottom walls form a channel which receives a rack 9 having gear teeth 10. The sides and bottom of the rack are slidingly guided for reciprocating linear movement by the front, back and bottom wall, respectively. The rack is engaged and driven by a pinion 11 secured on a short shaft 12 which is journalled in the walls 2 and 3. A crank arm 14 is securely attached to the front end of shaft 12. The crank arm 14 may be oscillated by any conventional power driven oscillating linkage or even by hand. When the crank arm 14 is oscillated about the axis of shaft 12, the latter and the pinion 11 likewise oscillate and thereby reciprocate the rack 9.

Figure 5:
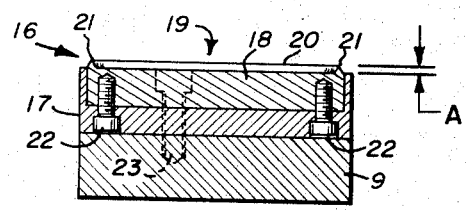
FIGURE 5 is a section taken on the line 5—5 of FIGURE 4.
Figure 6:
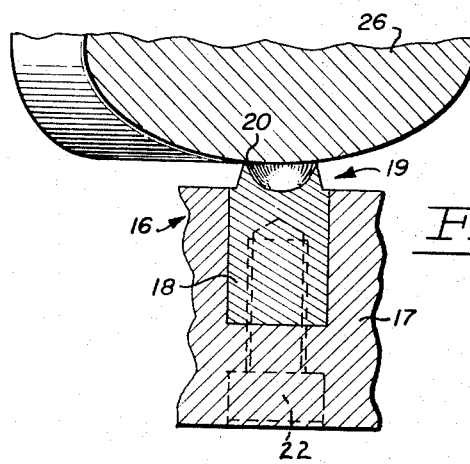
FIGURE 6 is an enlarged section of the perforating member taken on line 6—6 of FIGURE 4 with the mandrel added to illustrate the cooperation between the perforating edges of the perforating member and the mandrel.

Rack 9 carries a perforating member 16 which comprises a base 17 and a projecting portion 18 forming a perforating edge 19, all as shown best in FIGURES 4–6. The perforating edge 19 is in the form of a sharp ridge or knife edge. The knife edge 19 has a continuous or closed loop configuration having elongated spaced side portions 20 and connecting end portions 21. In order to simplify the manufacture, repair and replacement of the perforating edge 19, the projecting portion 18 is formed as a separate insert for base 17 and is releasably secured thereto by screws 22. Base 17 is in turn secured to rack 9 by screws 23.

Above rack 9 a mandrel 26 is rotatably journalled in the rear wall 3, see FIGURE 3. Mandrel 26 is simply a rod having a periphery of corresponding shape and size for receiving a tubular member 27 with a sliding fit thereon and with substantially no radial play relative thereto. Tubular member 27 may be cylindrical as shown in the drawings and useful as part of a lipstick holder assembly. As is well understood by those skilled in the art, the lipstick itself (not shown) normally would be received inside tube 27 and would be secured to a traveling base pad having a cam-follower projection received in a helical slot 28 in the tube 27. Tubular member 27 shown in the drawings is a one-piece member having an integral end and rim portion 29 adapted to be grasped and turned to rotate tubular member 27 about its axis and thus cause the base pad to travel axially of the tube to eject or retract the lipstick. The remainder of a holder assembly would of course include a stationary sleeve, not shown, around the tubular member 27. As previously stated, the object of the invention is to make a helical slot such as slot 28 in a pre-formed tubular member such as member 27 which is shown in FIGURE 2 after it has been operated upon by the apparatus of FIGURE 1 to form the helical slot 28.

Above rack 9 and mandrel 26 a second rack 32 is positioned with its gear teeth 33 in engagement with the driving pinion 11. Rack 32 is slidingly guided for straight line reciprocating movement by side walls 2 and 3 and top wall 5. In order to support the far end of rack 32, a second pinion 34 is positioned on the other side of mandrel 26 from the drive pinion 11. Pinion 34 is secured on a shaft 35 which is journalled in the walls 2 and 3. The gears on pinion 34 are in mesh with the gear teeth on both of the racks, just as the teeth on the drive pinion are in mesh with the teeth on both of the racks. Upper rack 32 carries a backing member 36 which is simply a block that projects below the lower edges of rack teeth 33 and which engages the top of a tubular member 27 on mandrel 26 when the lower surface of the tubular member is being perforated by the perforating member 16. Backing member 36 is secured to rack 32 by a plurality of screws 37, one such screw being shown in FIGURE 3.

In operation of the apparatus of FIGURE 1, crank arm 14 is first positioned slightly counterclockwise from the poistion shown in FIGURE 1 in order to move the perforating edge 19 to the right of mandrel 26 and in order to move the backing member 36 to the left of the mandrel. With the parts thus relatively positioned, called the loading position, the mandrel is free and unencumbered for reception of a tubular member 27. An imperforate member 27 is placed on the mandrel through an opening 39 in front wall 2. Crank arm 14 is then rotated in a clockwise direction to drive rack 9 and perforating member 16 to the left as viewed, thus moving perforating edge 19 across into the underside of tubular member 27 on mandrel 26 and simultaneously driving backing member 36 across and against the upperside of the tubular member. In the arrangement shown in FIGURE 1, the clockwise movement of the crank arm 14 drives rack 9 to the left as viewed and rack 32 to the right.

As shown best in FIGURES 3 and 6, the cooperation between the perforating member and mandrel preferably is such that the perforating edge 19 just engages the surface of the mandrel 26 so that the shell of the tubular member is severed wherever it is engaged by the perforating edge. As a result of the described movement of the perforating member and the cooperation between the perforating edge and the mandrel, the helical slot 28 is formed in tubular member 27 when the perforating member is driven across the underside of the mandrel. The part of the tubular member whichi s removed to form the slot 27 is a continuous strip having the same shape as the slot 28. It will be noted that even though the sides 20 of cutting edge 19 are straight lines, the fact that these sides are disposed at an angle to the axis of the mandrel, coupled with the rolling action of the tubular member, causes a helically shaped slot to be formed.

After crank arm 14 has been turned clockwise through an angle sufficient to drive the perforating edge and backing member fully across and out of contact with tubular member 27, slot 28 will have been formed and the tubular member may then be removed from the mandrel 26. The procedure may then be repeated with another imperforate tubular member.

The function of backing member 36 is to prevent upward bowing of the mandrel during the perforation step and thus maintain the tubular member in position for proper cooperation with perforating edge 19. The backing member additionally contributes to rotation of the tubular member about the mandrel axis at the proper rate for optimum perforating action. In addition, the backing member rolls the tubular member against the mandrel and tends to smooth imperfections in the shape of the former and to reform it to the shape of the mandrel. As shown in FIGURE 3, backing member 36 is positioned so as to be in tangential engagement with the tubular member. Although the planes in which the cutting edge 19 and the backing member 36 move during operation of the apparatus are fixed in the above described embodiment, it is of course possible to bias either or both of the parts vertically under the force of strong springs. For example, strong compression spring means could be placed between perforating member 16 and rack 9. Screws 23 would be arranged to allow the spring means to force the perforating member slightly higher than shown in FIGURES 1 and 3. Such a spring basing technique is especially useful in compensating for wear.

Figure 7:
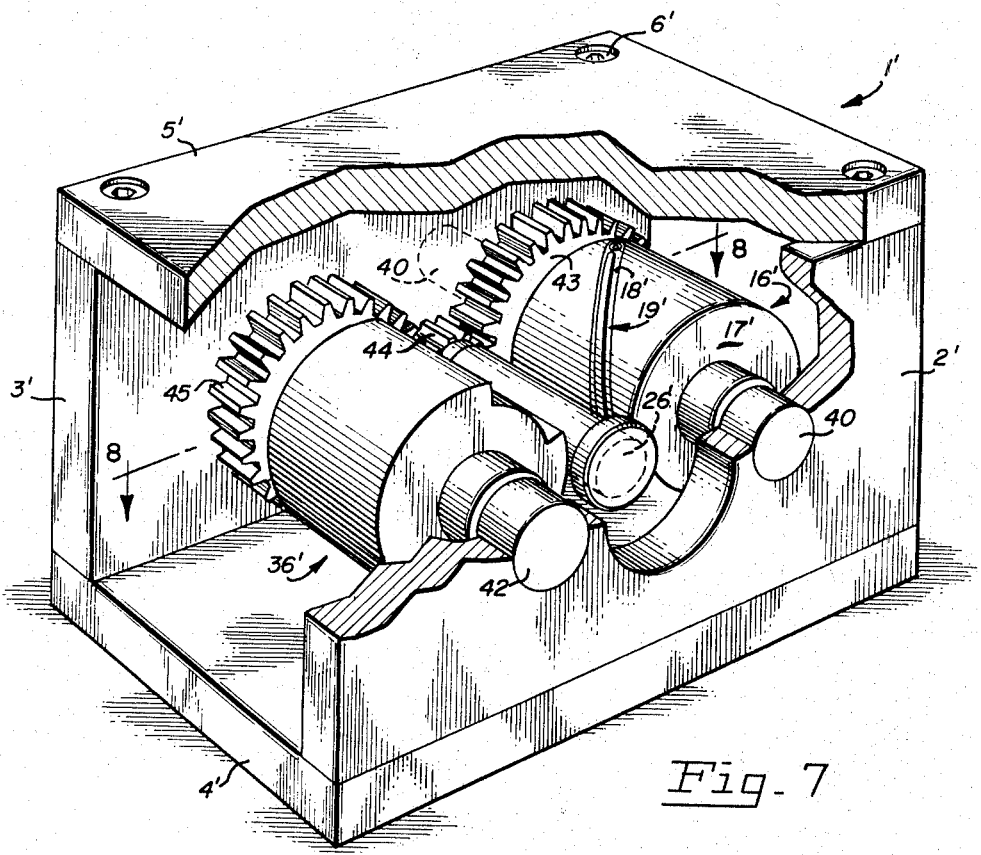
FIGURE 7 is a perspective view similar to FIGURE 1 showing another embodiment of the invention in which the perforating action is accomplished by rotary movement of the perforating member.

The invention may also be practiced with utility and advantage with rotary type cutting dies or perforating members. Such a rotary embodiment of the invention is shown in FIGURE 7 and will now be described. Parts which are similar to those in the embodiment of FIGURE 1 are identified with primed reference numbers. The embodiment of FIGURE 7 comprises a supporting structure 1' having a front wall 2', a back wall 3' and top and bottom walls 5' and 4'. The walls are held together by screws 6'.

The perforating member 16' is a roller-like base member 17', carrying a projecting portion 18' which has a perforating edge 19'. As shown best in FIGURES 7, 8 and 10, edge 19' functions as a shearing edge. However, like edge 19, shearing edge 19' is continuous and has elongated spaced side portions 20' and connecting end portions 21'. The projecting portion 18' preferably is a separate piece adapted to be inserted into and held therein by screws or the like. Perforating member 16' is secured to a drive shaft 40 for rotation therewith. Shaft 40 is journalled in the front wall 2' and back wall 3' and projects from the rear wall for coupling to suitable power or manual rotary drive means.

Figure 8:
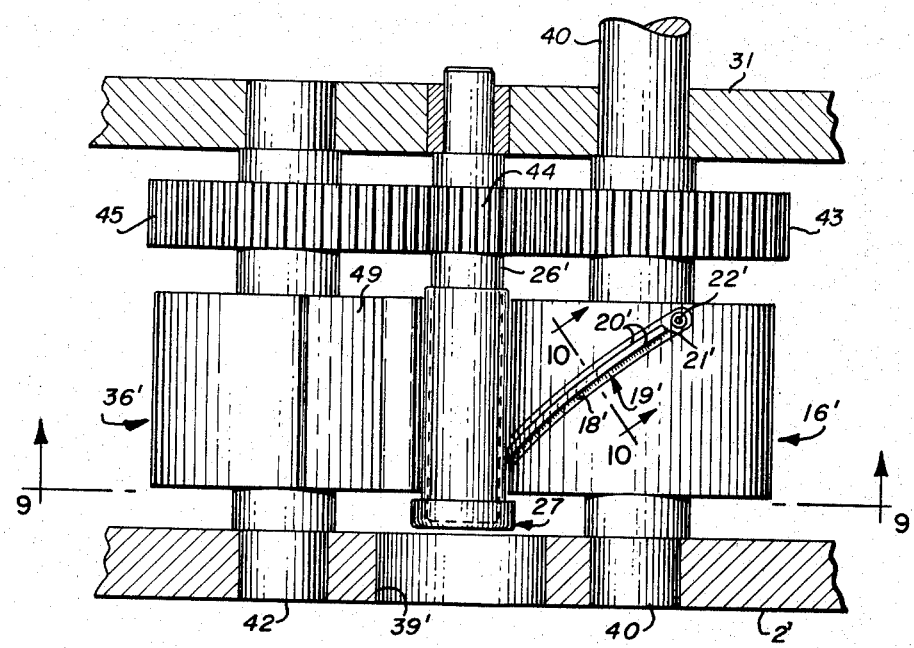
FIGURE 8 is a section taken on line 8—8 of FIGURE 7 showing a top plan view of the rotary members of FIGURE 7.
Figure 9:
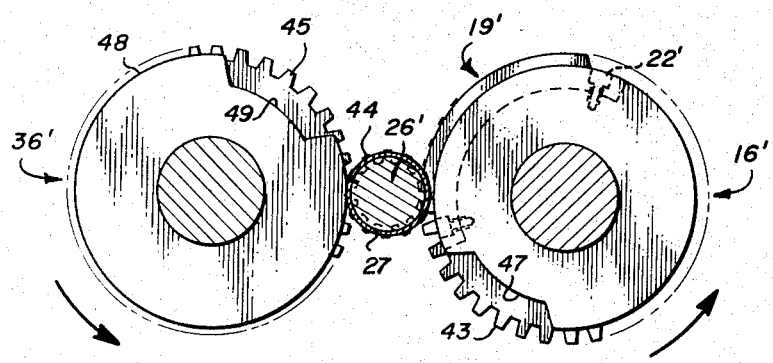
FIGURE 9 is a section taken on line 9—9 of FIGURE 8 showing an end view of the rotary members.

The apparatus 1' comprises a mandrel 26', see FIGURES 8 and 9, journalled in rear wall 3'. The principal difference between the mandrel 26' used with the rotary apparatus and mandrel 26 employed in the linear apparatus of FIGURE 1 is that the former is constrained to rotate in synchronism with the movement of the perforating edge as will be more fully explained hereinafter. The backing member 36' utilized with the rotary embodiment of FIGURE 7 is in the form of a roller mounted on a shaft 42 which is journalled in the walls 2' and 3'.

The means for driving the parts in the rotary apparatus of FIGURE 7 comprises gears 43 and 44 secured on shaft 40 and mandrel 26', respectively. More specifically, shaft 40 is rotated either by hand or a power drive and the gear 43 causes rotation of the mandrel 26' via the gear 44. Gear 44 in turn transmits the rotary drive motion to backing member 36' via the gear 45. The relative sizes of the gears 43 and 44 are selected so that the perforating edge 19' has a peripheral speed substantially equal to the peripheral speed of the mandrel 26'. As is apparent from FIGURE 9, the perforating member 16' has a peripheral portion 47 which is recessed to permit convenient loading and unloading of a tubular member on and from the mandrel after completion of a slotting operation. Backing member 36' has a peripheral portion 48 which rolls against the tubular member 27 and prevents deflection of the mandrel under the force developed by the perforating edge 19' against the tube. In addition, the backing member has a recessed peripheral portion 49 similar to that in member 16' to facilitate loading of a tubular member 27 on the mandrel.

It is now apparent that the linear apparatus of FIGURE 1 is different from the rotary apparatus of FIGURE 7 in that in the former the perforating and backing members have straight line or linear motion whereas the latter utilizes rotary motion in the forming of the slot. Another difference is that the mandrel 26' of the rotary embodiment is forcibly driven or constrained to rotate whereas the mandrel 26 in the linear apparatus is free to rotate. Free or constrained rotation of the mandrel is a feature that may be used in either of the two embodiments. In other words, the mandrel shown in FIGURE 1 could be geared to be rotated in synchronism with the movement of the perforating member, and the mandrel in FIGURE 7 could be freely rotatable as by having gear 44 journalled on the mandrel 26' instead of secured thereto.

Another difference between the embodiment of FIGURES 1 and 7 is that in the embodiment of FIGURE 1 the perforating edge 19 in the latter apparatus is knife-shaped in order to sever a tubular wall by pressing against the smooth surface of mandrel 26. In the embodiment of FIGURE 7, the perforating edge 19' meshes with a helical groove 52 in the mandrel, and the wall of a tubular member is severed by being sheared between the edges 20' and 21' and the entrance edges of the helical groove 52. The two types of perforating action are interchangeable in the embodiments of FIGURES 1 and 7. However, whenever the arrangement exists wherein the perforating member is used in cooperation with a groove in the mandrel, it is necessary that the mandrel be positively driven to present the mandrel to the perforating edge in rotational synchronism therewith so that the cutting edges mate. In connection with the groove 52 it is desirable to use spring means such as a leaf spring (not shown) for ejecting the severed strips from the groove. Such an arrangement is also usable in the groove between the perforating edges 20 of the embodiment of FIGURE 1.

Figure 10:
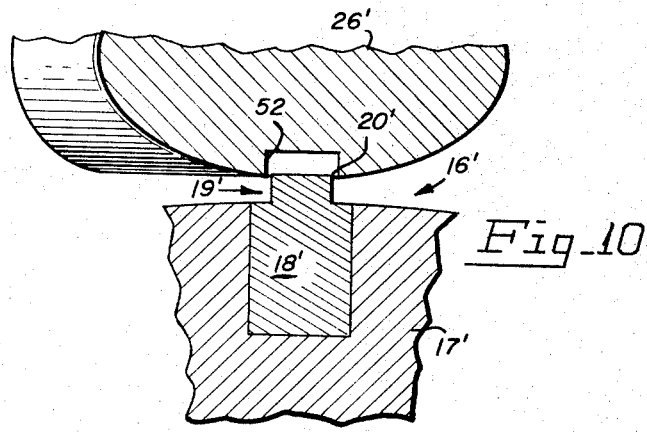
FIGURE 10 is a greatly enlarged fragmentary transverse section of the perforating member and the mandrel showing engagement between the perforating edge and mandrel in the embodiment of FIGURE 7.

In order to operate the embodiment of FIGURE 7, the drive shaft 40 is rotated until the recessed portions 47 and 49 of the perforating and backing members are both adjacent the mandrel 26' so that a space therebetween is presented in order to slide an imperforate tubular member 27 on the mandrel. The drive shaft 40 is rotated one substantially complete revolution so that the recessed portions 47 and 49 are again adjacent the mandrel and the tubular member is readily removed. Front wall 2' has an opening 39' through which the tubular member passes during loading and unloading operations. During the single revolution of the perforating member, perforating edge 19' mates with the helical groove 52 as shown in FIGURE 10 to make a helical slot 28 in the tubular member as shown in FIGURE 2. It is contemplated that an automatic feed mechanism be employed for inserting and removing tubular members in timed relation to the movement of the perforating members in both the linear apparatus of FIGURE 1 and the rotary apparatus of FIGURE 7.

Although specific details of the present invention are shown and described herein, it is to be understood that modifications may be made therein without departing from the spirit and scope of the invention as set forth in the appended claims. For example, the perforating member in both the linear and the rotary apparatus may be shaped to form other than helical slots as desired. Also, the invention may be practiced in slotting tubular objects having non-circular as well as circular cross-sections and therefore the term "tubular" as used in the claims is intended to apply to objects having such shapes.

I claim:

1. Apparatus for perforating a tubular object, said apparatus comprising a supporting structure, a mandrel on which a tubular object can be placed, a perforating member having a perforating edge, and a backing member, means for causing relative movement between said perforating member and said mandrel whereby said perforating edge will engage and perforate a tubular object on said mandrel, said perforating edge being in the form of a continuous knife edge projecting outwardly from said perforating member and forming a depression within the area outlined by said continuous knife edge, means for causing said backing member to engage a tubular object on said mandrel on the side of the tubular object opposite the side engaged by the perforating edge, means connecting said mandrel to said supporting structure in a manner such that the axis of said mandrel is held stationary, and means for causing relative movement between said backing member and said mandrel in a direction and at a rate which will urge a tubular object on said mandrel to rotate in the same direction and rate by engagement with said backing member as it is urged by engagement with said perforating edge.

2. Apparatus for perforating a tubular object comprising a supporting structure, a mandrel on which a tubular object can be placed, a perforating member having a perforating edge, means for causing straight line motion between said perforating member and said mandrel along a path which will cause said perforating edge to cross the axis of said mandrel and engage and perforate a tubular object on said mandrel, and said mandrel being journalled in said supporting structure for rotation about the axis of the mandrel whereby the axis of the mandrel is prevented from shifting its angular relation to the direction of said straight line motion.

3. Apparatus as claimed in claim 2 further comprising a backing member engageable with a tubular object on said mandrel.

4. Apparatus a sclaimed in claim 3 wherein said means for causing straight line motion comprises two racks positioned one on each side of said mandrel, a pinion positioned between said racks with the teeth on the pinion engaging the teeth on both racks whereby when said pinion is rotated said racks move in opposite directions, said perforating member being supported on the mandrel side of one of said racks, and said backing member being supported on the mandrel side of the other of said racks.

5. Apparatus as claimed in claim 4 wherein said perforating edge is in the form of a continuous knife edge having two elongated spaced side portions and connecting end portions.

6. Apparatus for perforating a tubular object comprising a supporting structure, a mandrel on which a tubular object can be placed, a backing member engageable with a tubular object on said mandrel, a perforating member having a perforating edge extending in a direction skewed to the axis of said mandrel, means for rotating said perforating member to cause said perforating edge to engage and helically perforate a tubular object on said mandrel, and said mandrel being supported by said supporting structure in such a manner that the axis of said mandrel is pervented from shifting its angular relation to the axis of rotation of said perforating member.

7. Apparatus for perforating a tubular object comprising a supporting structure, a mandrel on which a tubular object can be placed, drive means for rotating said mandrel, a perforating member having a perforating edge extending in a direction skewed to the axis of said mandrel, means for rotating said perforating member to cause said perforating edge to engage and helically perforate a tubular object on said mandrel, and said mandrel having a helical groove and being supported by said supporting structure in such a manner that the axis of said mandrel is prevented from shifting its angular relation to the axis of rotation of said perforating member, the means for rotating said mandrel and perforating member being coordinated so that said perforating edge rolls along said groove when the perforating member and mandrel are rotated.

8. Apparatus as claimed in claim 7 in which said perforating edge is formed by an elongated projection curved around a cylindrical surface and yet contained in a flat plane.

9. The method of forming a helical slot in the wall a preformed tubular object comprising the steps of supporting said object for rotation about a fixed axis, moving a perforating member with a straight perforating edge transversely of said axis in a direction that extends transverse to said perforating edge, and engaging said perforating edge progressively with the wall of the object and simultaneously rotating said object about said axis.

10. The method of forming a helical slot in the wall a preformed tubular object comprising the steps of mounting said object on a mandrel rotatable about a fixed axis, moving a perforating member with a straight perforating edge in a straight line path transversely across said axis with said edge skewed to said axis and causing said edge to progressively engage and perforate the wall of the object, permitting said mandrel to rotate about said axis while said perforating edge engages said object, simultaneously engaging the side of said object opposite from the perforating member with a backing member, disengaging the edge and the backing member from said object, and removing said object from the mandrel.

11. The method of forming a helical slot in the wall a tube comprising the steps of mounting said tube on a mandrel rotatable about a fixed axis, rotating a perforating member about an axis parallel to the mandrel axis and causing an elongated perforating edge on the periphery of and skewed to said axis of the member to progressively roll over and perforate the wall of the tube, simultaneously rotating said mandrel about its axis at an angular velocity such that the peripheral velocity of said tube is equal to the peripheral velocity of the perforating member, engaging the side of said tube opposite from the perforating member with a rotatable backing member when the perforating edge engages the tube wall, disengaging the backing member and the perforating member from the tube after the slot is formed, and removing the tube from the mandrel.

References Cited

UNITED STATES PATENTS

| | | | |
|---|---|---|---|
| 1,424,472 | 8/1922 | Goldberg | 83—411 X |
| 1,669,397 | 5/1928 | Lindsay | 83—423 X |
| 1,726,466 | 8/1929 | Blair | 142—26 X |
| 1,934,660 | 11/1933 | Fairchild | 83—411 X |
| 2,556,965 | 6/1951 | Gomez | 83—54 |
| 3,065,983 | 11/1962 | Flumerfelt | 10—86 |

WILLIAM W. DYER, JR., *Primary Examiner.*

J. M. MEISTER, *Examiner.*

L. TAYLOR, *Assistant Examiner.*